United States Patent [19]
Singhal

[11] Patent Number: 5,888,173
[45] Date of Patent: Mar. 30, 1999

[54] HEALTH SAVER COMPUTER BREAK

[76] Inventor: Tara Chand Singhal, P.O. Box 5075, Torrance, Calif. 90510

[21] Appl. No.: 513,407

[22] Filed: Aug. 10, 1995

[51] Int. Cl.[6] ........................................... G06F 3/00
[52] U.S. Cl. ................................ 482/8; 434/227
[58] Field of Search ........................ 482/8; 434/227–233; 364/569, 551.01; 348/61; 601/37; 702/41; 701/41, 56, 176; 706/926, 927; 400/703, 704

[56] References Cited

U.S. PATENT DOCUMENTS

| | | | |
|---|---|---|---|
| 5,305,238 | 4/1994 | Starr et al. | 364/569 |
| 5,384,593 | 1/1995 | Gell et al. | 348/61 |

*Primary Examiner*—Glenn E. Richman
*Attorney, Agent, or Firm*—Nydegger & Associates

[57] ABSTRACT

A method for providing a health break while using computers, for those aspects of health that are impacted by use of computers for sustained periods of time. These health aspects are those which cause strain and fatigue of muscles in the neck, hand and back areas. Another, important health aspect is the strain on the ciliary muscles in the eye used for focussing. These muscles are strained by sustained visualization of the video screen. The method requires the operating system to pause the application, display a health related break message and an eye related health message at different rates for preset times. This message illustrates the purpose of break and what should be done during the break. The user has the features to delay or cancel the health related break message.

24 Claims, 3 Drawing Sheets

HEALTH SAVER COMPUTER BREAK

BACKGROUND

Various kinds of computers have become very common. Specifically, general purpose digital computers for home and office and special purpose game playing computers utilizing Television screens have become far more common in homes with children. Using a computer presents one draw back for humans that is not easily self evident. Human health is impacted by continuous and sustained use of computers. The areas in which human health is impacted are: posture strain caused by sitting in one position for a long time, wrist/finger strain caused by heavy use of keyboard and mouse, and eye and head strain caused by sustained visualization of the computer display in the form of a video screen.

Over the years, the public has become conscious of these factors and there have been developed various products to counter the adverse effect on human health. Examples of such products are: special furniture designs for computer use, wrist pads, ergonomic keyboards, tilt screens, and glare shield screens. While these products help, they may not be totally effective in all those human health areas that are impacted by the use of computers. For example, body postures sustained for long times still strain the body's muscles. Moreover, none of these products are intended to solve the eye fatigue problem caused by sustained close up visualization of the video screen. Sustained close up visualization of a video screen presents a unique problem of its own, which has not been widely understood by public using the computers.

The muscles in the eye that control the focussing of the eye lens, called ciliary muscles, are at rest when the eye is focussed at a far distance. These muscles contract to change the curvature of the eye lens to enable it to focus at close distances. For example, eyes looking at objects 20 feet or greater away do not use focussing muscles in the eye. Alternately, the eyes looking at distances shorter than 20 feet until the reading distance cause the eye muscles to be proportionately contracted until they are fully contracted the maximum amount to focus at the reading distance.

Normal operation of the human vision, before computers became prevalent, required looking at objects at all distances, so that the eye muscles for focussing at various distances were in continuous play. Even while doing close work such as sewing or reading a book, the focussing muscles were activated periodically. In contrast, when a computer screen is looked at, the focussing distance is fixed, and remains fixed. This requires the eye's focussing muscles to remain in the strained state for long periods of time. This is an artificial or an unnatural use of muscles of the eye brought on by the use of computers in this manner.

Like other muscles in the body, the ciliary muscles are fatigued by sustained focusing on a video screen. If the body remains in one posture for a long time, the muscles are strained. The eye muscles when looking at a screen are strained. This commonly is one of the leading causes of deterioration of eye's ability to focus at far objects or also called near sightedness. Research validates, that the cause of increase of near sightedness or myopia in the world has been the indoor working environments and the lack of opportunities to focus the eyes at far distance.

In Cornell Chronicle (Jun. 22, 1995), Roger Segelken writes "The visual experience of close work the reading, writing and arithmetic that young eyes never evolved to do—finally is being seen as one cause for the worldwide increase in myopia". He quotes Cornell University, vision researcher and professor of neurobiology, Howard C. Howland, "Ten years ago, most researchers believed that myopia was only genetically controlled, Howland said. Now, the effect of environmental and feedback loops on growth of the eye is known: When eyes are not focussed in the distance, they grow the wrong way".

This research establishes a connection between focussing muscles of the eye lens and near sightedness or myopia which is the lengthening of the eye ball. The connection is that if the eyes do close work for sustained periods of time, then the eye muscles that focus the eye lens, also exert forces on the shape of the eye ball, making it longer and thereby causing myopia.

Ubiquitousness and increase in various kinds of computer simulations and games for adults and children makes the problem worse. In these situations the users are not conscious of the sustained focussing at a computer screen and the harm being caused to their eyes. Use of computers plays a pivotal role in users having to focus at video screens for sustained periods of time.

The groups of people most vulnerable are those working in data processing and similar environments, requiring staying in front of a computer terminal for better part of the day and children engrossed in games that last for long periods of time; and those who might loose track of time, of how long they have been sitting in front of a computer terminal.

Therefore an object of the present invention is to find a method to minimize the fatigue of the eye muscles while working on a computer.

Another object of the present invention is to find a method to minimize the fatigue on aspects of the human body strained by sitting in one posture, while working on a computer.

Another object is to find a method that would minimize the increase in myopia brought on by heavy use of computers for educational as well as entertainment purposes.

SUMMARY

Use of computers presents one draw back for humans that is not easily self evident. Human health is impacted by continuous and sustained use of computers in three areas: posture strain, wrist/finger strain and eye and head strain.

A method for providing a health related break while using computers, for those aspects of health that are impacted by use of computers for sustained periods of time, is described. These health aspects are those which cause strain and fatigue of muscles in the eyes, neck, hand and back areas.

The method requires the computer's operating system to periodically pause the application being run, annunciate a health related break message for a preset time and resume the application after the expiration of the break time. The health related break message illustrates the purpose of the break and what should be done during the break.

One embodiment of a health related break is that the computer operating system program creates a time break, where the application being worked on is put on hold. A message is annunciated regarding the health related break. This message calls attention to the need to take a break, purpose of the break and what activities should be performed during the break. After the conclusion of the break, the application program is resumed.

In the preferred embodiment a health related message is displayed which illustrates the purpose of the break, the benefits, and how the break time should be utilized. The display instructs the user through visual means the activities that should be done to relieve the stress and strain, which the user is generally not aware of. In some situations, for example in software intended for young adults, the health related message may be supplemented by an aural message.

The health related break is preferably divided in two types of breaks. One break is more frequent and of a shorter duration and is for the health of the eyes. Another break is less frequent and of longer duration and is for the health of the other muscles in the body.

The more frequent and shorter duration eye health related break is a means to provide health related break for the purpose of reducing fatigue of the ciliary muscles of the eye. It might be of the order of one to two minutes, every 10 to 20 minutes. The break may also be of 15 to 30 seconds every five to ten minutes. Studies may be used to establish an optimum time for the eye related break. During the break an eye related video screen is displayed. The eye break time is used to relax the ciliary muscles by closing the eyes to relax the muscles, and/or by looking at a far object to relax the muscle.

The longer and less frequent health related break time is used for relieving strain in neck, hand and back muscles. The break is utilized by stretching, moving in place or by walking around for posture and giving wrist and finger muscles rest. This break may be taken every one to hours and may be of three to five minute duration. Again the time and frequency of the break may be based on studies for optimum benefit.

The operating system in conjunction with the health related screen message also provides means for the users to control the break. Such control requires users to select the frequency and duration of the break from a pre-established guideline. For children, the break may be made compulsory, while adults could override and or change the timing and frequency of the break to suit their particular environment. Another feature is the ability to delay the break for a short time, like the snooze function in an alarm clock.

The health related break screens are very useful for workers who work in data processing field, requiring staying on a computer terminal for better part of the day. It is also very useful for game playing machines, where the game may continue for long time periods. It may also be useful in many other applications, where users are not aware of the stress caused to their bodies and thus may not use body's natural reflex warnings to relieve such stresses.

DRAWINGS

These and other features, aspects and advantages of the present invention will become better understood with regard to the following description, appended claims and accompanying drawings, where:

DESCRIPTION

A method for a health break, while using computers, for the purpose of reducing neck, back and hand fatigue caused by maintaining a strained head, back and hand posture for sustained periods of time and also a health break for the purpose of reducing eye fatigue caused by sustained viewing of computer screen is described.

Figure 1:
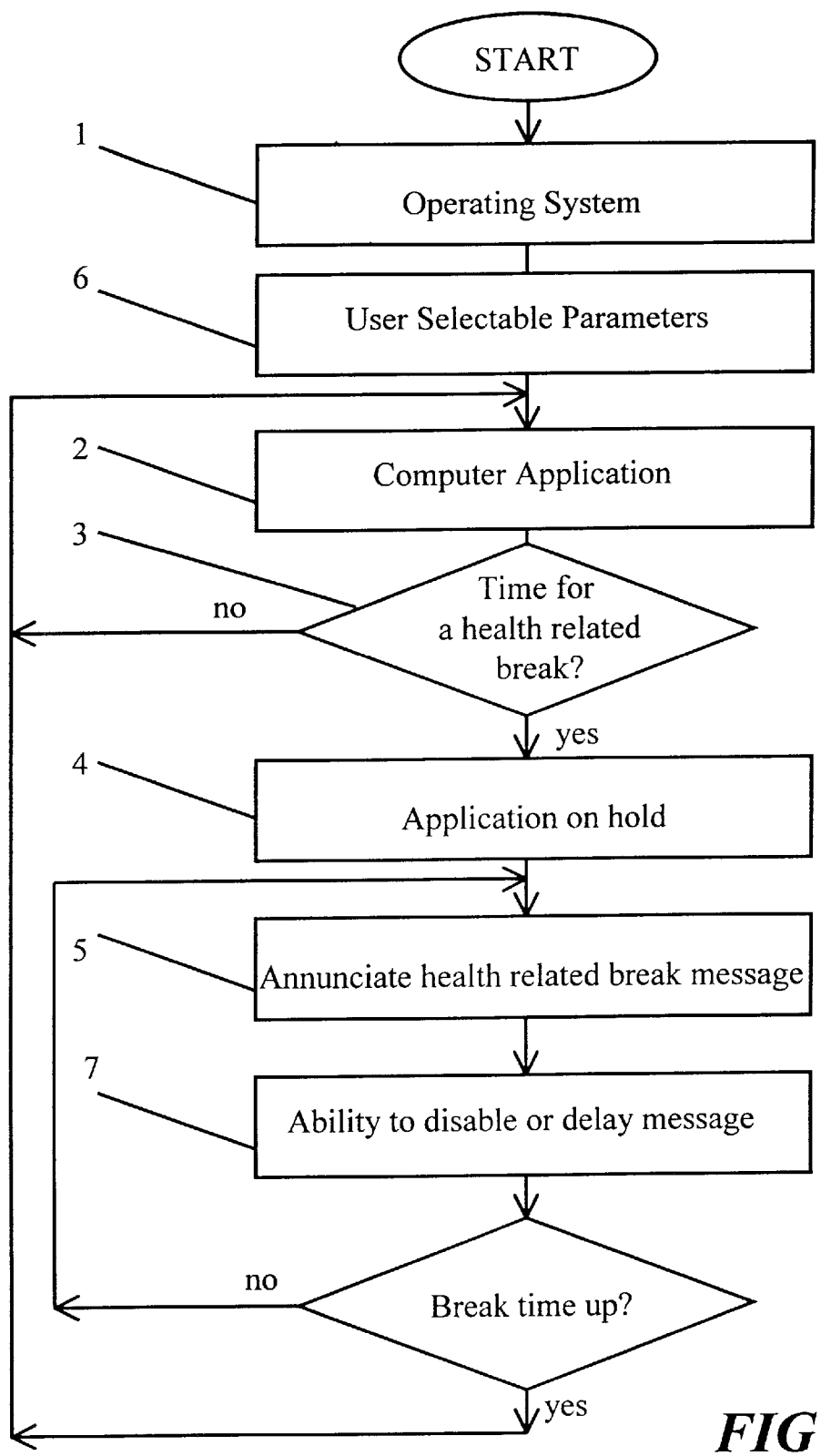
FIG. 1 is a computer operation method for a health related break.

Refer to FIG. 1. A method of creating health related break while using computers, has a computer under control of an operating system (1), capable of executing at least one application program (2). The operating system is programmed to create a computer application operation hold at predetermined intervals (3), the operating system putting the computer application operation on hold (4), for the purpose of a health related break for a duration sufficient for users to take such health break, and annunciating a health related break message (5). The duration and frequency of break being user selectable based on a guideline (6).

A break delaying feature and a break canceling feature means are provided (7). A break canceling feature cancels the health related break for the current session of the user. A break delaying feature postpones the break for a preset time.

Figure 2:
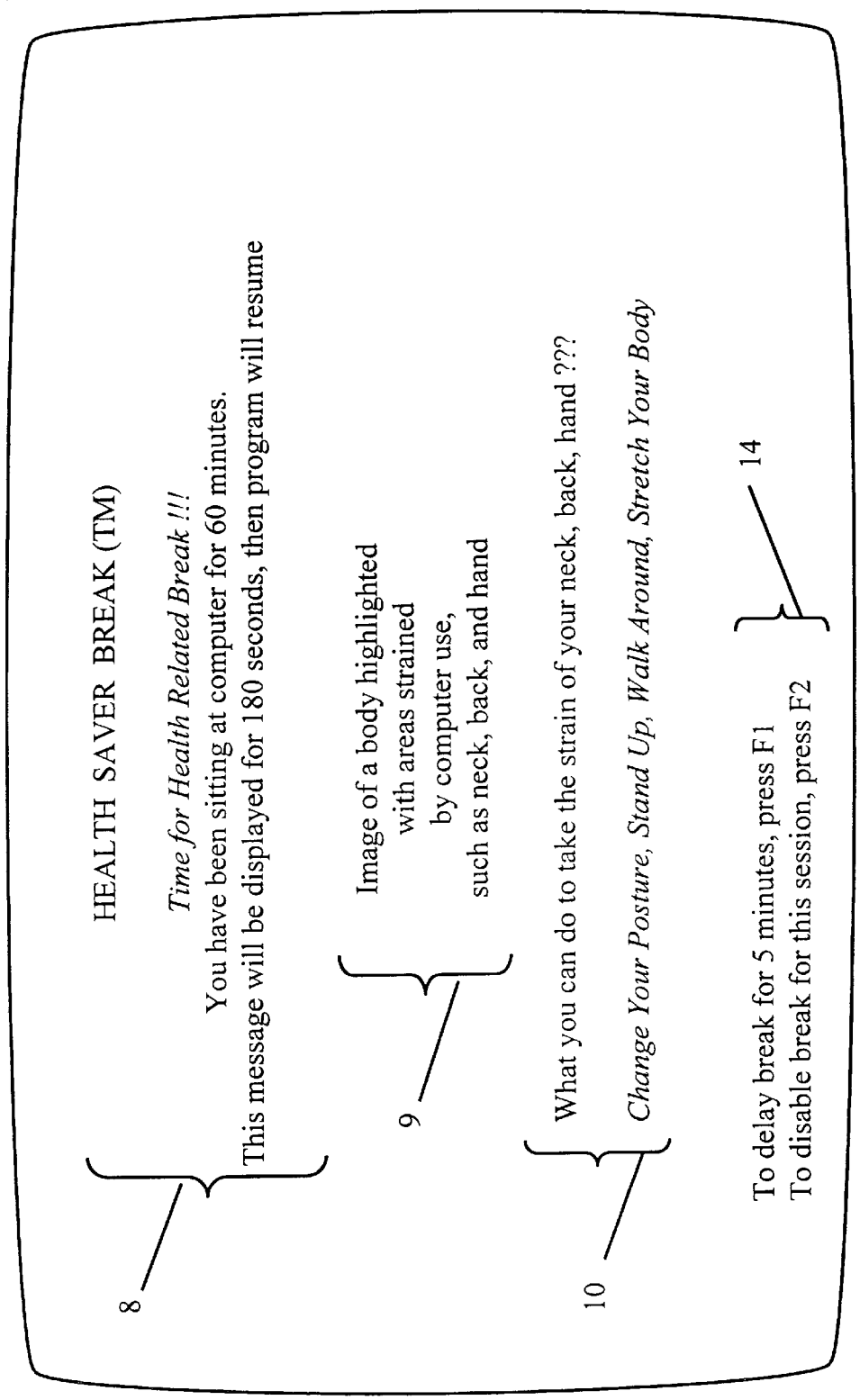
FIG. 2 is a version of a health related break message screen.

Refer to FIG. 2. The health related break message displays a health related break message screen. The health related break message screen has a visual illustration of break purpose (8). The visual illustration preferably includes an image of body, highlighting the strained muscles (9). The screen also shows visual illustrations of actions to be performed regarding health aspects impacted by use of computers (10).

Figure 3:
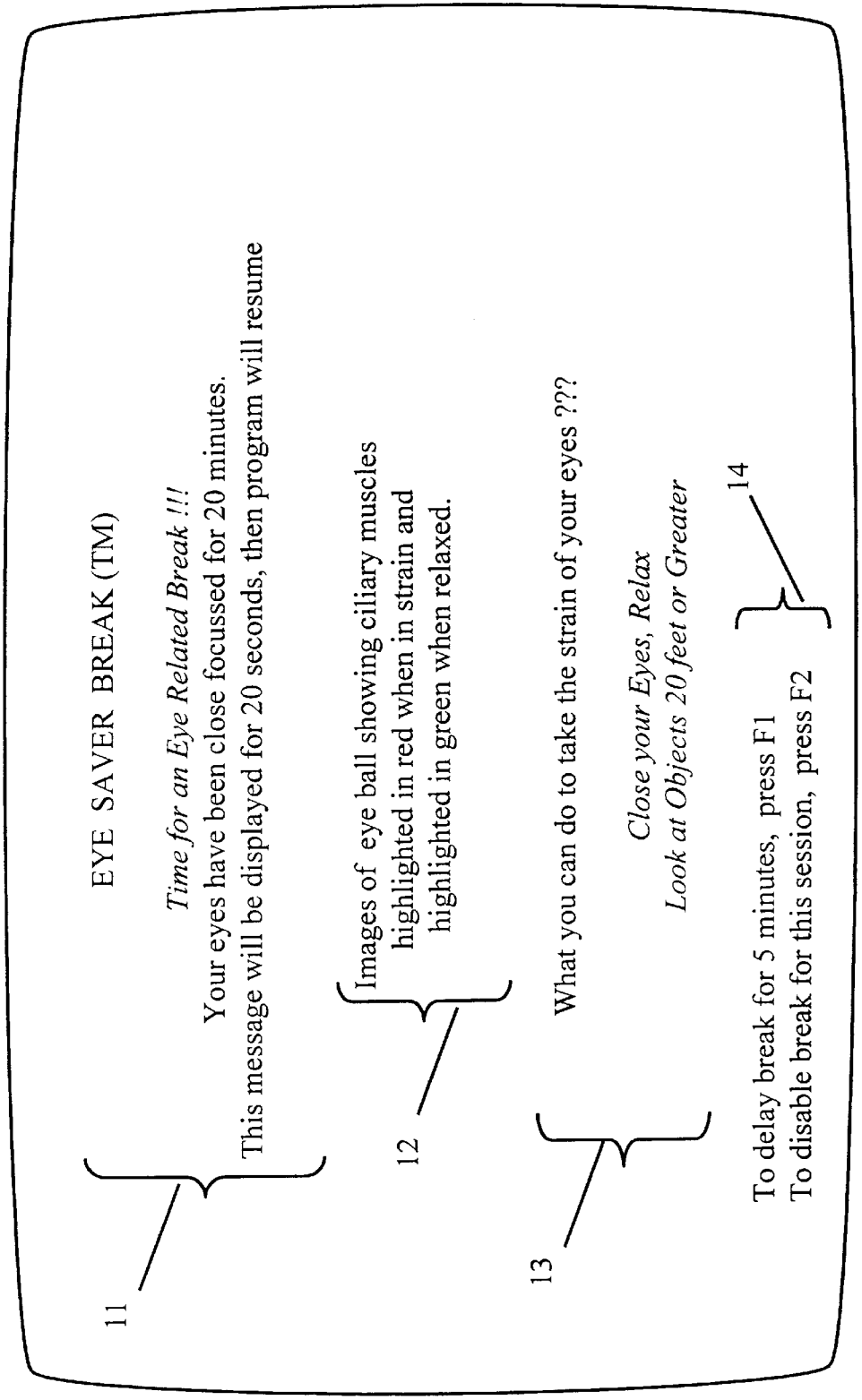
FIG. 3 is a version of an eye related break message screen.

Refer to FIG. 3. The eye related break message displays an eye related break message screen. The eye related break message screen has a visual illustration of break purpose (11). The visual illustration preferably includes an image of eye ball showing the ciliary muscles highlighted to show relaxed state and strained state (12). The screen also shows a visual illustrations of actions to be performed regarding eye health aspects impacted by use of computers (13).

The screen message may be supplemented by an aural message and may be desirable for computer software specifically made for children for education and entertainment.

The message screens also indicate the actions to be performed to delay or cancel the health related break (14).

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for initiating a break for a user on a computer which includes an operating system for operating an application program on the computer, the method comprising the steps of:

initiating with the computer, an interruption in the operation of the application program on the computer at a predetermined time interval, the predetermined time interval being the criteria for initiating the interruption, the predetermined time interval being without reference to the activities of the user;

transmitting a health related message during at least a portion of the interruption; and automatically resuming the operation of the application program upon completion of the interruption.

2. The method of claim 1 wherein the step of transmitting a health related message includes transmitting a visual computer health related message upon a computer screen which is also used to display at least a portion of the application program.

3. The method of claim 1 wherein the step of transmitting a health related message includes transmitting an audio computer health related message.

4. The method of claim 1 wherein the step of transmitting a health related message includes transmitting an illustration of at least a portion of a human body affected by extended usage of the computer.

5. The method of claim 1 wherein the step of transmitting a health related message includes transmitting at least one illustration of proposed exercises for a user of the computer, the proposed exercises being directed towards a portion of a human body affected by extended usage of the computer.

6. The method of claim 1 wherein the step of transmitting a health related message a visual health related message upon a computer screen directed towards a portion of a human body affected by extended usage of the computer.

7. The method of claim 1 including the step of selectively adjusting the duration of the interruption.

8. The method of claim 1 including the step of selectively adjusting the predetermined time interval.

9. The method of claim 1 including the step of postponing the interruption.

10. A computer including an operating system which performs the method of claim 1.

11. A method for initiating a break on a computer which includes an operating system for operating an application program on the computer and a computer screen which is used in conjunction with the computer, the method comprising the steps of:

initiating with the computer, an interruption in the operation of the application program on the computer at a predetermined time interval, the predetermined time interval being the criteria for initiating the interruption, the predetermined time interval being without reference to the activities of the user;

transmitting a visual health related message on the computer screen during at least a portion of the interruption, the visual health related message relating to a portion of a human body affected by computer usage; and automatically resuming the operation of the application program.

12. The method of claim 11 wherein the step of transmitting a visual health related message includes transmitting an audio computer health related message.

13. The method of claim 11 wherein the step of transmitting a visual health related message includes transmitting a visual illustration of a portion of a human body affected by usage of the computer.

14. The method of claim 11 wherein the step of transmitting a visual health related message includes transmitting a visual illustration of proposed exercises for the user of the computer.

15. The method of claim 11 wherein the step of transmitting a visual health related message includes transmitting the muscles of the human body effected by computer usage.

16. The method of claim 11 wherein the step of initiating with the computer includes initiating the interruption after operation of the application program for a predetermined time interval.

17. A computer including an operating system which performs the method of claim 11.

18. A method for initiating a break on a computer which includes an operating system for operating an application program on the computer and a computer screen, the method comprising the steps of:

initiating an interruption in the operation of the application program on the computer at a predetermined time interval, the operation of the application program for the predetermined time interval being the criteria for initiating the interruption, the predetermined time interval being without reference to the activities of the user;

transmitting a health related message on the computer screen during at least a portion of the interruption, the health related message including a visual illustration of a portion of a human body affected by the computer usage, and a visual illustration of proposed exercises for the user of the computer; and automatically resuming the operation of the application program.

19. The method of claim 18 including the step of selectively adjusting the duration of the interruption and selectively adjusting the predetermined time interval.

20. A computer including software which includes the method of claim 18.

21. A method for initiating a break on a computer which includes an operating system for operating an application program on the computer and a computer screen, the method comprising the steps of:

initiating with the computer, an interruption in the operation of the application program on the computer at a predetermined time interval, the predetermined time interval being the criteria for initiating the interruption, the predetermined time interval being without reference to the activities of the user;

transmitting a health related message onto the computer screen during at least a portion of the interruption, the health related message regarding a human eye; and automatically resuming the operating of the application program.

22. The method of claim 21 wherein the step of transmitting the health related message includes transmitting an illustration of at least a portion of the human eye affected by extended usage of the computer.

23. The method of claim 21 wherein the step of transmitting the health related message includes transmitting at least one illustration of proposed eye exercises for a user of the computer.

24. A computer including software which includes the method of claim 21.

* * * * *